("12") United States Patent
Sato

(10) Patent No.: US 8,872,939 B2
(45) Date of Patent: Oct. 28, 2014

(54) IMAGE PROCESSING APPARATUS AND INFORMATION MANAGEMENT SYSTEM

(75) Inventor: Hideki Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 769 days.

(21) Appl. No.: 12/544,642

(22) Filed: Aug. 20, 2009

(65) Prior Publication Data

US 2010/0060743 A1   Mar. 11, 2010

(30) Foreign Application Priority Data

Sep. 5, 2008   (JP) .................... 2008-229033

(51) Int. Cl.
*H04N 5/76*       (2006.01)
*H04N 1/44*       (2006.01)
*H04L 29/06*      (2006.01)
*H04N 1/00*       (2006.01)
*H04N 7/173*      (2011.01)

(52) U.S. Cl.
CPC .............. *H04N 1/4413* (2013.01); *H04L 63/08* (2013.01); *H04N 1/00244* (2013.01); *H04N 1/4426* (2013.01); *H04N 1/4433* (2013.01); *H04N 1/00204* (2013.01); *H04N 1/00347* (2013.01); *H04N 2201/0041* (2013.01); *H04N 2201/0087* (2013.01); *H04N 2201/0094* (2013.01); *H04N 2201/3205* (2013.01); *H04N 2201/3208* (2013.01); *H04N 2201/3278* (2013.01)
USPC ........................ 348/231.2; 725/105

(58) Field of Classification Search
USPC ........................................ 348/231.2
See application file for complete search history.

(56) References Cited

U.S. PATENT DOCUMENTS

| 6,636,620 | B1 * | 10/2003 | Hoshino | 382/124 |
|---|---|---|---|---|
| 7,154,536 | B2 * | 12/2006 | Kuwayama | 348/207.99 |
| 7,904,572 | B2 * | 3/2011 | Tadokoro et al. | 709/229 |
| 2004/0018014 | A1 * | 1/2004 | Doi | 396/429 |
| 2005/0093999 | A1 * | 5/2005 | Yamaya | 348/231.99 |
| 2006/0262356 | A1 * | 11/2006 | Honda et al. | 358/400 |
| 2007/0036558 | A1 * | 2/2007 | Huss et al. | 399/8 |
| 2007/0065143 | A1 * | 3/2007 | Didow et al. | 396/429 |
| 2008/0114903 | A1 * | 5/2008 | Tadokoro et al. | 710/8 |
| 2008/0162947 | A1 * | 7/2008 | Holtzman et al. | 713/193 |
| 2008/0266322 | A1 * | 10/2008 | Isomura | 345/629 |
| 2008/0303909 | A1 * | 12/2008 | Watanabe et al. | 348/211.2 |
| 2009/0217058 | A1 * | 8/2009 | Obereiner et al. | 713/193 |

FOREIGN PATENT DOCUMENTS

| JP | 2007-295294 | 11/2007 |
|---|---|---|
| JP | 2008-108143 | 5/2008 |
| JP | 2008-118333 A | 5/2008 |
| JP | 2008-194942 | 8/2008 |

* cited by examiner

*Primary Examiner* — Tuan Ho
*Assistant Examiner* — Christopher K Peterson
(74) *Attorney, Agent, or Firm* — Kubotera & Associates, LLC

(57) ABSTRACT

An image processing apparatus includes a storage unit for storing user information correlating user identification information and acknowledger information in advance; an image file acquiring unit for acquiring the image file; and a control unit for controlling a writing process in a detachable storage medium. The control unit includes a registration processing unit for correlating the user identification information and authentication information contained in an acknowledgement notice, and for registering the user identification information and the authentication information as acknowledgement information in the storage unit. The control unit further includes a determining unit for determining whether the user identification information and the authentication information received through an input unit are registered in the acknowledgement information, and for allowing the image file stored in the storage unit to be written in the detachable storage medium when the authentication notice is authenticated.

19 Claims, 12 Drawing Sheets

400 Acknowledgement information

| Registration number | User ID | Execution password | Page number | Deletion time |
|---|---|---|---|---|
| 1 | 100 | abcdefg | 2 | 180 |
| 2 | 101 | ascvd | 1 | 60 |

600 Acknowledgement mail

```
User ID: 100
Execution password: abcdefg
Page number: 2
Deletion time: 180 seconds
```

FIG. 5

510 Image file information
| User ID | File name | Hash value |
|---|---|---|
| 101 | ABC.pdf | 0x3F42 |
| 102 | DEF.pdf | 0x549A |
FIG. 14
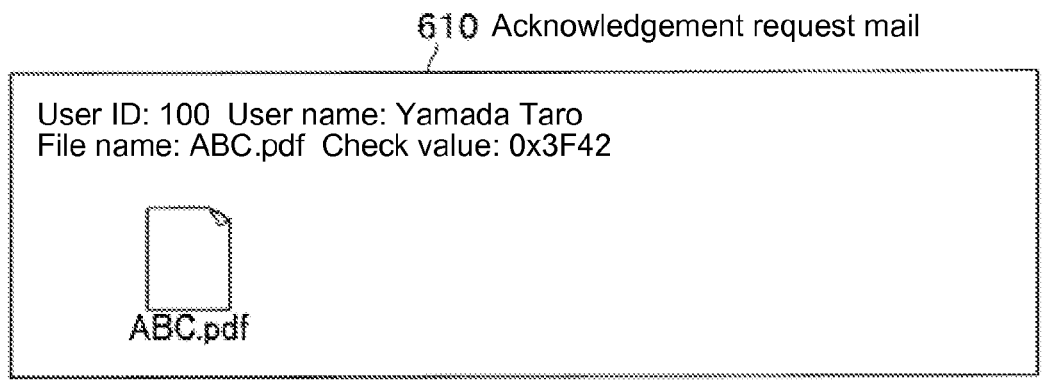
FIG. 15
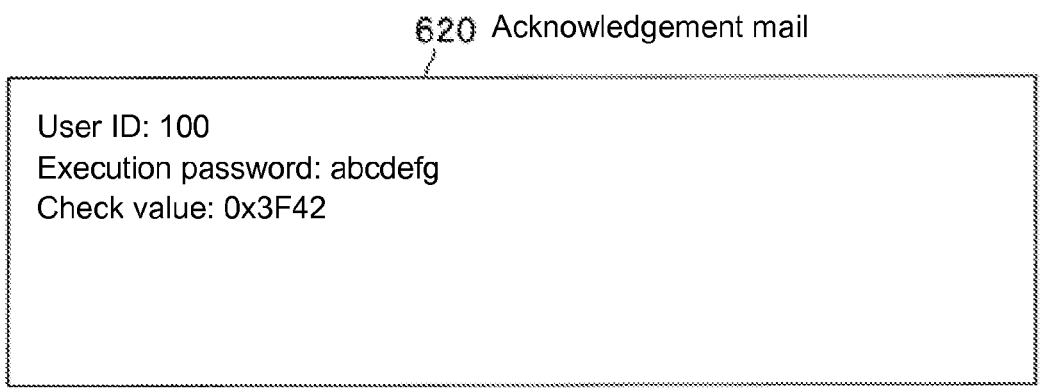
FIG. 16

IMAGE PROCESSING APPARATUS AND INFORMATION MANAGEMENT SYSTEM

BACKGROUND OF THE INVENTION AND RELATED ART STATEMENT

The present invention relates to an image processing apparatus for acquiring an image file, and an information management system including the image processing apparatus. More specifically, the present invention relates to an image processing apparatus capable of storing data in a detachable external storage medium.

A conventional multi-function product has various functions such as a printing function, a scanning function, a copying function, and a facsimile function. The scanning function includes a function of directly storing scan data in a detachable external storage medium such as a USB (Universal Serial Bus) memory, so-called "Scan to USB Memory" function.

Patent Reference has disclosed a conventional technology, in which scan data are temporarily stored in an internal memory disposed in a main body of a multi-function product when the scan data are transmitted to a USB memory without scanning one more time in a case that a capacity of the internal memory is full, i.e., memory over. After the transmission is suspended due to the memory over, when the transmission is resumed, the scan data stored in the internal memory disposed in the main body of the multi-function product are transmitted.

Patent Reference: Japanese Patent Publication No. 2008-118333

In the conventional technology of transmitting the scan data to the USB memory described above, it is possible for anyone to transmit the scan data, thereby posing security concern. In the technology disclosed in Patent Reference, after the memory over is solved, the scan data are automatically transmitted, thereby posing security concern.

In view of the problems described above, an object of the present invention is to provide an image processing apparatus and an information management system capable of improving security when image file data are transmitted (written) to an external storage medium.

Further objects and advantages of the invention will be apparent from the following description of the invention.

SUMMARY OF THE INVENTION

In order to attain the objects described above, according to the present invention, an image processing apparatus includes a storage unit for storing an image file; an image file acquiring unit for acquiring the image file to be stored in the storage unit; and a control unit for controlling a writing process for writing the image file in a detachable storage medium.

The storage unit stores user information for correlating user identification information for identifying a user of the image processing apparatus and acknowledger information in advance. The control unit includes a registration processing unit for correlating the user identification information and authentication information contained in an acknowledgement notice when the user identification information and the acknowledger information contained in the acknowledgement notice to be acknowledged are registered in the user information upon receiving the acknowledgement notice through a communication unit for acknowledging that the image file is written in the detachable storage medium, and for registering the user identification information and the authentication information as acknowledgement information in the storage unit. The control unit further includes a determining unit for determining whether the user identification information and the authentication information received through an input unit are registered in the acknowledgement information, and for allowing the image file stored in the storage unit to be written in the detachable storage medium when the authentication notice is authenticated.

In the present invention, it is possible to improve security when data of the image file are transmitted to the external storage medium.

BRIEF DESCRIPTION OF THE DRAWINGS

FIG. 4 is a schematic view showing an example of acknowledgement information according to the first embodiment of the present invention;

FIG. 5 is a schematic view showing an example of an acknowledgement mail according to the first embodiment of the present invention;

FIG. 14 is a schematic view showing an example of image file information according to the second embodiment of the present invention;

FIG. 15 is a schematic view showing an example of an acknowledgement request mail according to the second embodiment of the present invention;

FIG. 16 is a schematic view showing an example of an acknowledgement mail according to the second embodiment of the present invention;

DETAILED DESCRIPTION OF THE PREFERRED EMBODIMENTS

Figure 1:
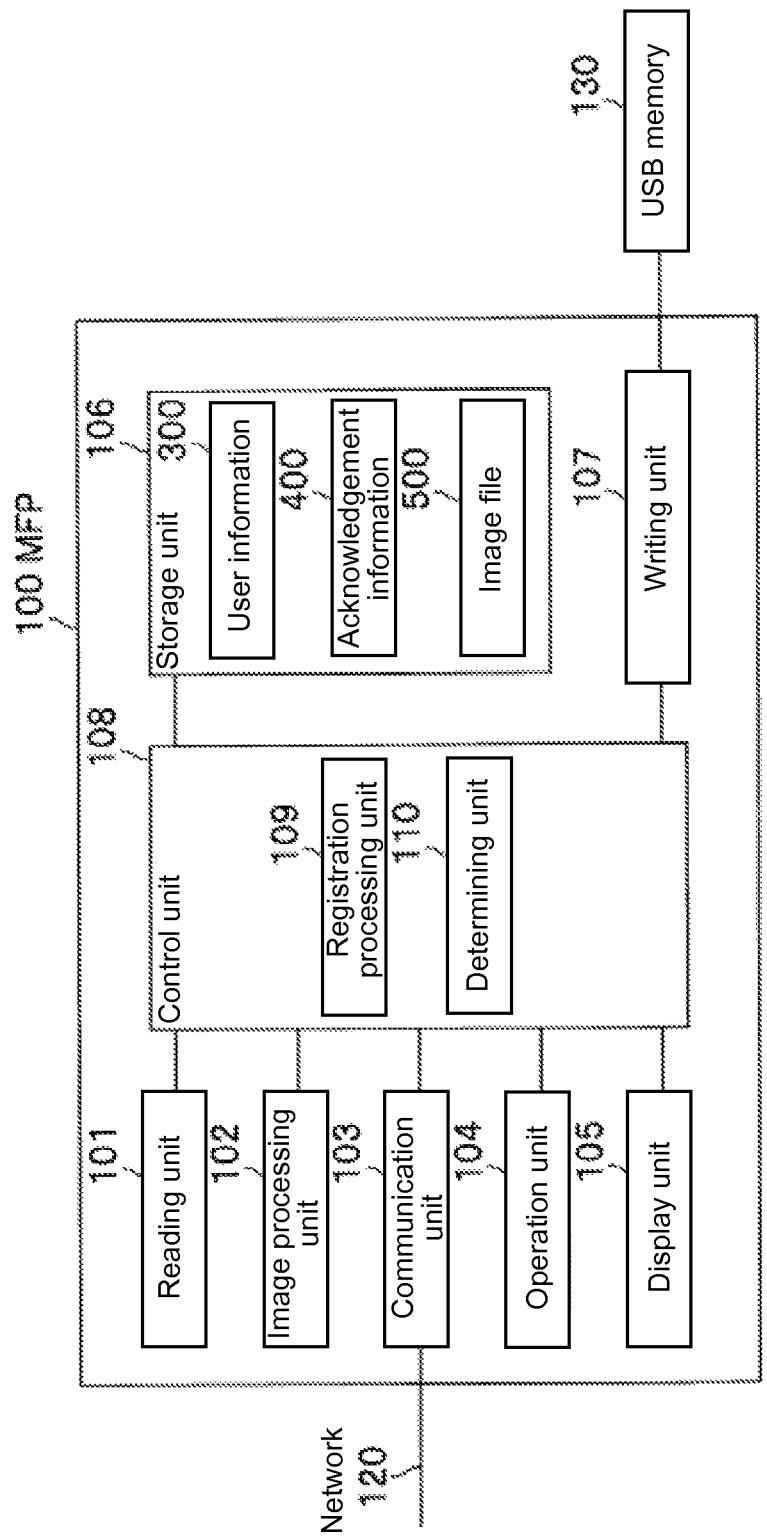
FIG. 1 is a block diagram showing an image processing apparatus according to a first embodiment of the present invention.

Hereunder, embodiments of the present invention will be explained with reference to the accompanying drawings.
First Embodiment A first embodiment of the present invention will be explained. FIG. 1 is a block diagram showing an image processing apparatus according to the first embodiment of the present invention. In the first embodiment, a multi-function product (MFP) 100 as the image processing apparatus scans an original (including an image file), and data are transmitted to and stored in a USB (Universal Serial Bus) memory 130.

As shown in FIG. 1, the MFP 100 includes a reading unit 101 as an image file acquiring unit; an image processing unit 102; a communication unit 103; an operation unit 104 as an input unit; a display unit 105; a storage unit 106; a writing unit 107; and a control unit 108. The control unit 108 controls each component. The control unit 108 includes a CPU (Central Processing Unit); an RAM (Random Access Memory); an ROM (Read only Memory); and the likes.

In the embodiment, the reading unit 101 has a function of reading an original set on an ADF (auto document feeder, not shown) of the MFP 100, and may include, for example, a scanner. The image processing unit 102 has a function of converting the original thus read to an image file 500, and is capable of converting to, for example, a file with PDF (Portable Document Format) or TIFF (Tagged Image File Format).

In the embodiment, the communication unit 103 is connected to a network 120, and has a communication function. The operation unit 104 has a function of inputting a password when the image file 500 is transmitted to the USB memory 130. In this case, a password may be input through, for example, an operation panel 700 (refer to FIG. 6) disposed in the MFP 100. The display unit 105 has a function of displaying an input request to a user, and displays a message 800 (refer to FIG. 7) or a message 900 (refer to FIG. 8).

In the embodiment, the control unit 108 includes a registration processing unit 109 for registering acknowledgement information 400 (refer to FIG. 4) into the storage unit 106 from an acknowledgement mail 600 (an acknowledgement notice, refer to FIG. 5). Further, the control unit 108 includes a determining unit 110 for determining whether the image file is allowed to write into the USB memory 130 according to information input from the operation unit 104. The storage unit 106 stores user information (refer to FIG. 3) registered by an administrator in advance, the acknowledgement information 400, and the image file 500. The user information 300 is used for logging in the MFP 100.

Figures 2, 3:
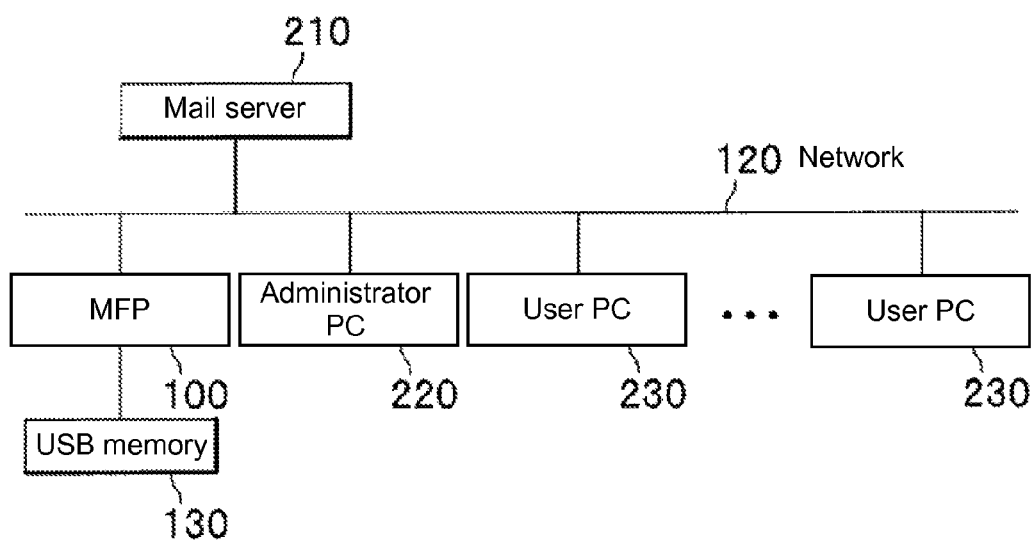
FIG. 2 is a block diagram showing a configuration of a network according to the first embodiment of the present invention.
FIG. 3 is a schematic view showing an example of user information according to the first embodiment of the present invention.

FIG. 2 is a block diagram showing a configuration of the network 120 according to the first embodiment of the present invention. The network 120 such as LAN (Local Area Network) is connected to the MFP 100, a mail server 210, user PCs (Personal Computer) 230, an administrator PC 220 (an acknowledgement terminal), and the likes. The user PC 230 transmits a request mail for storing the image file in the USB memory 130. When the administrator PC 220 receives the request mail, the administrator PC 220 transmits an acknowledgement mail 600 (refer to FIG. 5) according to acknowledgement of an administrator.

In the embodiment, the MFP 100 has an insertion opening portion for inserting the USB memory 130. Note that it is not limited to the administrator PC 220 in FIG. 2 for transmitting the acknowledgement mail 600. One of the user PCs 230 may transmit the acknowledgement mail 600. In this case, the request mail may be transmitted to, for example, an upper rank manager, and the upper rank manager uses the user PC 230 to transmit the acknowledgement mail 600.

FIG. 3 is a schematic view showing an example of the user information 300 according to the first embodiment of the present invention.

As shown in FIG. 3, the user information 300 includes a user ID (user identification information) 301 assigned to each user; a user name 302; a login password 303 for a user to login the MFP 100; and an acknowledger mail address (acknowledger information) 304 of an acknowledger requesting acknowledgement when the user writes the image file to the USB memory 130. An administrator of the MFP 100 registers each of the items described above in advance, so that a general user cannot register or alter the items.

FIG. 4 is a schematic view showing an example of the acknowledgement information 400 according to the first embodiment of the present invention.

As shown in FIG. 4, the acknowledgement information 400 includes a registration number 401; a user ID (user identification information) 402; an execution password (identification information) 403 to be input when the image file is written in the USB memory 130; a page number 404 that the acknowledger allows to create the image file; and a deletion time 405 indication a duration of time until the execution password 403 is deleted.

In the embodiment, the page number 404 is specified, so that it is possible to restrict a page number to be stored in the USB memory 130. Further, the deletion time 405 is registered, so that corresponding record including the execution password 403 is deleted from the acknowledgement information 400 when the execution password 403 is not deleted from the operation unit 104 (refer to FIG. 1) after the acknowledgement mail 600 is received.

In the embodiment, the registration processing unit 109 (refer to FIG. 1) analyzes a mail content of the acknowledgement mail 600 (refer to FIG. 5), so that the registration processing unit 109 retrieves the user ID 402, the execution password 403, the page number 404, and the deletion time 405. Then, the registration processing unit 109 adds the registration number 401 to the user ID 402, the execution password 403, the page number 404, and the deletion time 405, and registers the registration number 401, the user ID 402, the execution password 403, the page number 404, and the deletion time 405.

For example, in the case of a registration number 1 in FIG. 4, the user ID 402 is 100; the execution password 403 is "abcdefg"; the page number 404 is 2; and the deletion time 405 is 180 seconds. Further, in the case of a registration number 2 in FIG. 4, the user ID 402 is 101; the execution password 403 is "ascvd"; the page number 404 is 1; and the deletion time 405 is 60 seconds. When the acknowledgement mail 600 does not contain the deletion time 405, the registration processing unit 109 may sets a default value (for example, 3,600 seconds) as the deletion time 405.

FIG. 5 is a schematic view showing an example of the acknowledgement mail 600 according to the first embodiment of the present invention.

As shown in FIG. 5, the acknowledgement mail 600 includes a main text formed of a user ID to be registered in the acknowledgement information 400 (refer to FIG. 4); an execution password; a page number; and a deletion time. In the example of the acknowledgement mail 600 shown in FIG. 5, the user ID is 100; the execution password is "abcdefg"; the page number is 2; and the deletion time is 180 seconds, i.e., contents corresponding to the registration number 1 shown in FIG. 4.

In the embodiment, in addition to the main text, the acknowledgement mail 600 contains a mail address of a sender in a mail header thereof. The registration processing unit 109 (refer to FIG. 1) compares the mail address of the sender with the acknowledger mail address (refer to FIG. 3) registered by the administrator. When the mail address of the sender matches to the acknowledger mail address, the registration processing unit 109 registers the mail address of the sender in the acknowledgement information 400. When the mail address of the sender does not match to the acknowledger mail address, the registration processing unit 109 determines that the mail is not sent from the acknowledger and does not register the mail address of the sender in the acknowledgement information 400. Accordingly, it is possible to exclude a mail sent from an unauthorized user.

Figure 6:
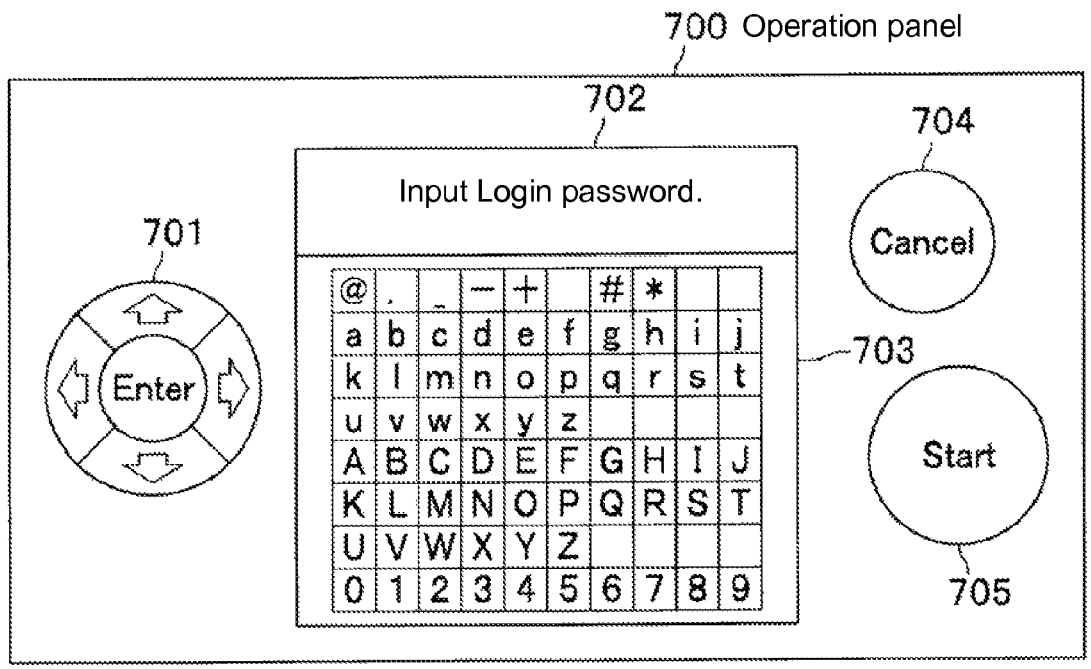
FIG. 6 is a schematic view showing an operation panel of the image processing apparatus according to the first embodiment of the present invention.

FIG. 6 is a schematic view showing the operation panel 700 of the image processing apparatus 100 according to the first embodiment of the present invention.

As shown in FIG. 6, the operation panel 700 is an example of the operation unit 104 and the display unit 105. The operational panel 700 includes a selection portion 701 formed of a vertical/lateral key and an enter key; a display screen 702; a display panel 703 for displaying a list of characters, numbers, and symbols to be selected when the login password 303 or the execution password 403 is input; a cancel key 704; and a start key 705 for starting a scan.

In the embodiment, when a message "Input user ID" or "Input Login password" is displayed on the display screen 702 as shown in FIG. 6, the user input a user ID and a login password, so that the user is allowed to use the MFP 100. Then, the user sets an original on the ADF of the MFP 100, and pushes the start key 705. Accordingly, the ADF transports the original, and the MFP 100 starts reading the original. At this moment, the message 800 (refer to FIG. 7) is displayed on the display screen 702 shown in FIG. 6.

Figure 7:
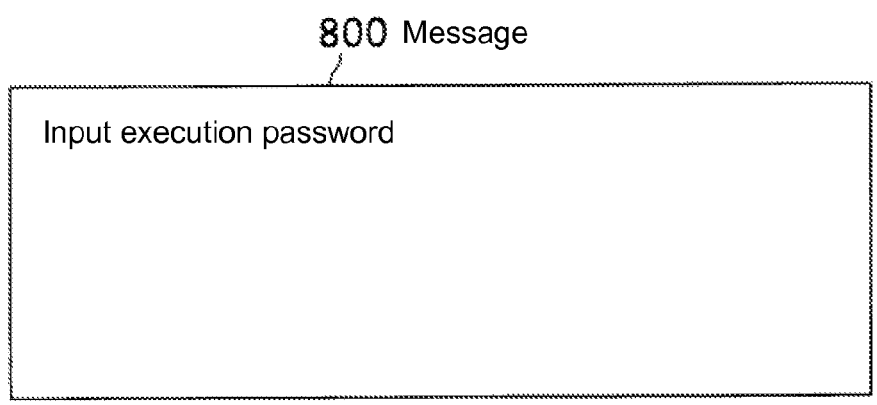
FIG. 7 is a schematic view showing an example of a message for requesting an execution password according to the first embodiment of the present invention.

FIG. 7 is a schematic view showing an example of the message 800 for requesting the execution password 403 according to the first embodiment of the present invention. When the message 800 such as "Input execution password" is displayed, the MFP 100 prompts the user to input the execution password 403. When the user inputs an execution password, and the determining unit 110 (refer to FIG. 1) determines that the execution password is not registered in the acknowledgement information 400, the message 900 (refer to FIG. 8) is displayed on the display screen 702 shown in FIG. 6.

Figure 8:
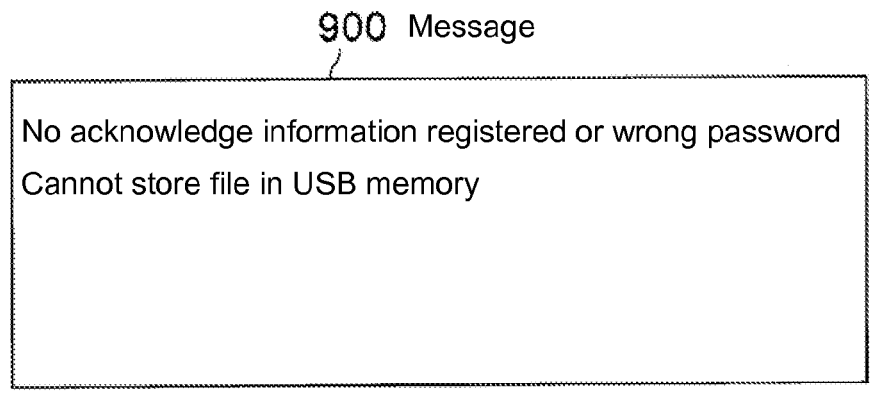
FIG. 8 is a schematic view showing an example of a message when an image file is not allowed to store in a USB (Universal Serial Bus) memory according to the first embodiment of the present invention.

FIG. 8 is a schematic view showing an example of the message 900 when the image file 500 is not allowed to store in the USB (Universal Serial Bus) memory 130 according to the first embodiment of the present invention. In this case, the message 900 such as "No acknowledge information registered or wrong password, Cannot store file in USB memory" is displayed on the display screen 702 shown in FIG. 6.

Figure 9:
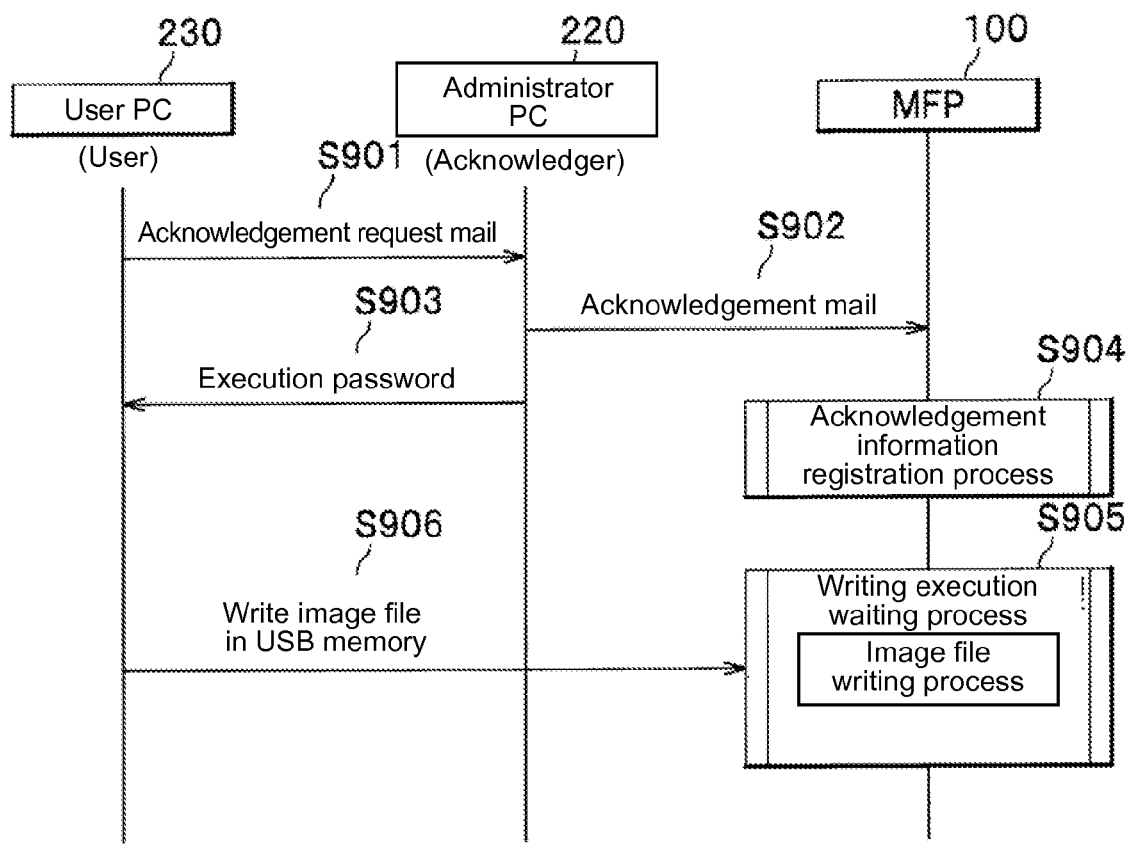
FIG. 9 is a schematic view showing a sequence of an operation of the image processing apparatus according to the first embodiment of the present invention.

An operation of the MFP 100 will be explained next. FIG. 9 is a schematic view showing a sequence of the operation of the image processing apparatus 100 according to the first embodiment of the present invention.

In step S901, the user sends an acknowledgement request mail through the user PC 230, so that the acknowledger allows the user to store the image file in the USB memory 130. When the acknowledger receives the acknowledgement request mail with the administrator PC 220, the acknowledger confirms contents of the acknowledgement request mail.

In step S902, when the acknowledger allows the user to store the image file in the USB memory 130, the acknowledger sends the acknowledgement mail 600 (refer to FIG. 5) to the MFP 100. In step S903, the acknowledger sends a response mail containing the execution password 403 to the user. The response mail may contain a deletion time in addition to the execution password 403. In this case, the user needs to store the image file in the USB memory 130 within the deletion time.

Figure 10:
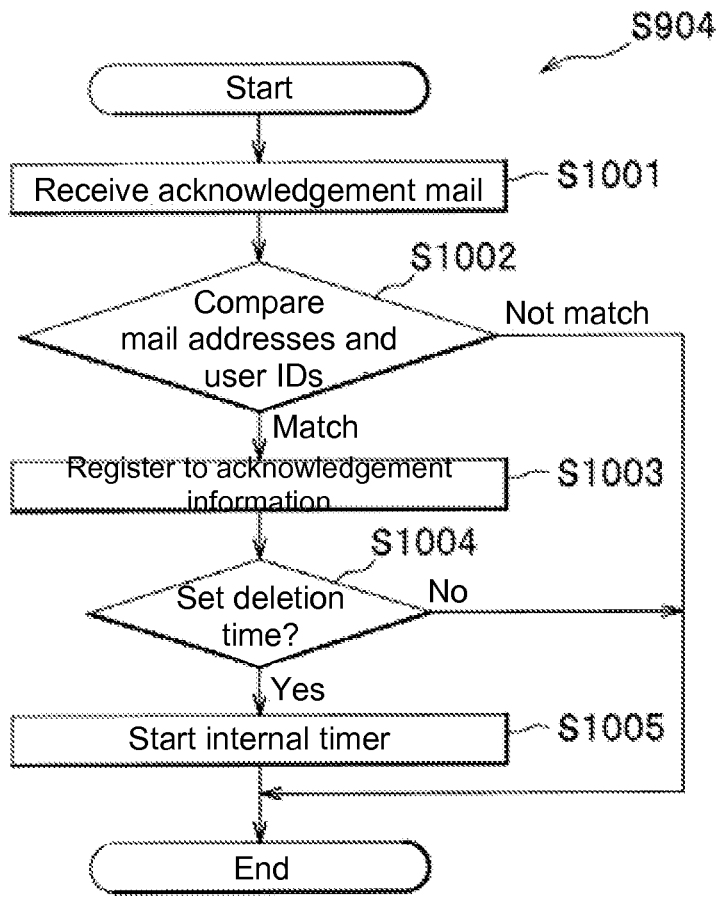
FIG. 10 is a flow chart showing an acknowledgement information registration process of the image processing apparatus according to the first embodiment of the present invention.

In step S904, when the MFP 100 receives the acknowledgement mail 600, the MFP 100 performs an acknowledgement information registration process (refer to FIG. 10). In step S905, the MFP 100 performs a writing execution waiting process (refer to FIG. 11). In step S906, the user inserts the USB memory 130 into the insertion opening portion of the MFP 100, so that the image file is written in the USB memory 130.

In the embodiment, the process from step S901 to step S903 is performed through an exchange of the mails. Alternatively, the user may request to the acknowledger in person, and the acknowledger gives permission to the user in person.

FIG. 10 is a flow chart showing the acknowledgement information registration process (step S904) of the image processing apparatus 100 according to the first embodiment of the present invention.

In step S1001, when the communication unit 103 of the MFP 100 receives the acknowledgement mail 600 from the acknowledger, the registration processing unit 109 retrieves a mail address of the sender from the mail header and a user ID from a main text. In step S1002, the registration processing unit 109 compares the mail address and the user ID with the acknowledger mail address and the user ID 301 registered as the user information 300 (refer to FIG. 3).

In step S1003, when it is determined that the mail address and the user ID match to the acknowledger mail address and the user ID 301 in step S1002, the registration processing unit 109 registers the contents (the user ID, the execution password, the page number, the deletion time) contained in the main text of the acknowledgement mail 600 as the acknowledgement information 400 (refer to FIG. 4). When it is determined that the mail address and the user ID do not match to the acknowledger mail address and the user ID 301 in step S1002, it is determined that the acknowledger does not send the mail. Accordingly, the contents are not registered in the acknowledgement information 400, thereby completing the process.

In step S1004, the control unit 108 determines whether the deletion time is set in the acknowledgement information 400 thus registered. In step S1005, when the control unit 108 determines that the deletion time is set in step S1004, an internal timer disposed in the control unit 108 starts timing. When the control unit 108 determines that the deletion time is not set in step S1004, the internal timer does not start, thereby completing the process.

Figure 11:
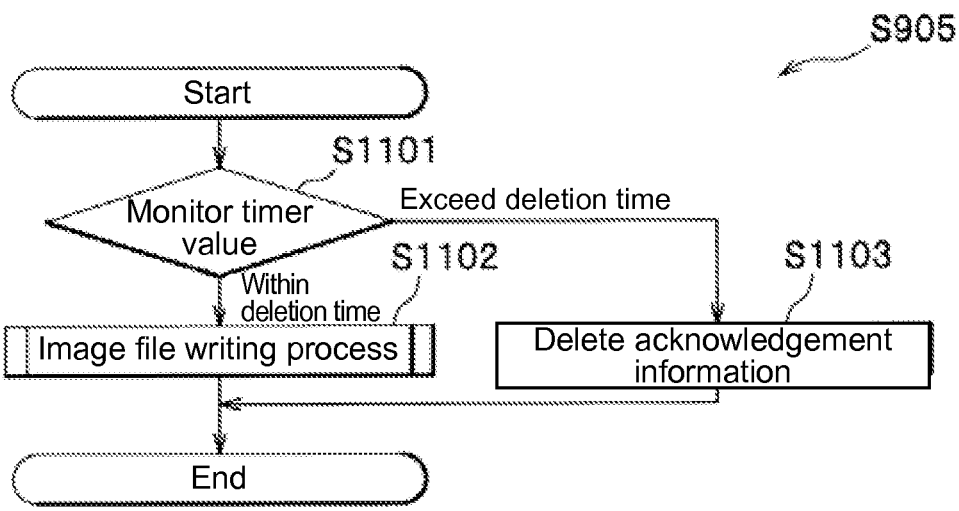
FIG. 11 is a flow chart showing a writing execution waiting process of the image processing apparatus according to the first embodiment of the present invention.

FIG. 11 is a flow chart showing the writing execution waiting process (step S905) of the image processing apparatus 100 according to the first embodiment of the present invention.

In step S1101, the control unit 108 monitors a timer value of the internal timer, so that the control unit 108 determines whether the timer value is within the deletion time. In step S1102, when the control unit 108 determines that the timer value is within the deletion time in step S1101, the control unit 108 performs an image file writing process (refer to FIG. 12), thereby completing the process. In step S1103, when the control unit 108 determines that the timer value exceeds the deletion time in step S1101, the control unit 108 deletes the acknowledgement information 400 having a corresponding registration number, thereby completing the process.

In the embodiment, after the control unit 108 deletes the acknowledgement information 400 having the corresponding registration number, even when the user requests to write the image file in the USB memory 130, it is not possible to write the image file in the USB memory 130. Accordingly, it is possible to obtain security for preventing the image file from being stolen using the USB memory 130.

Figure 12:
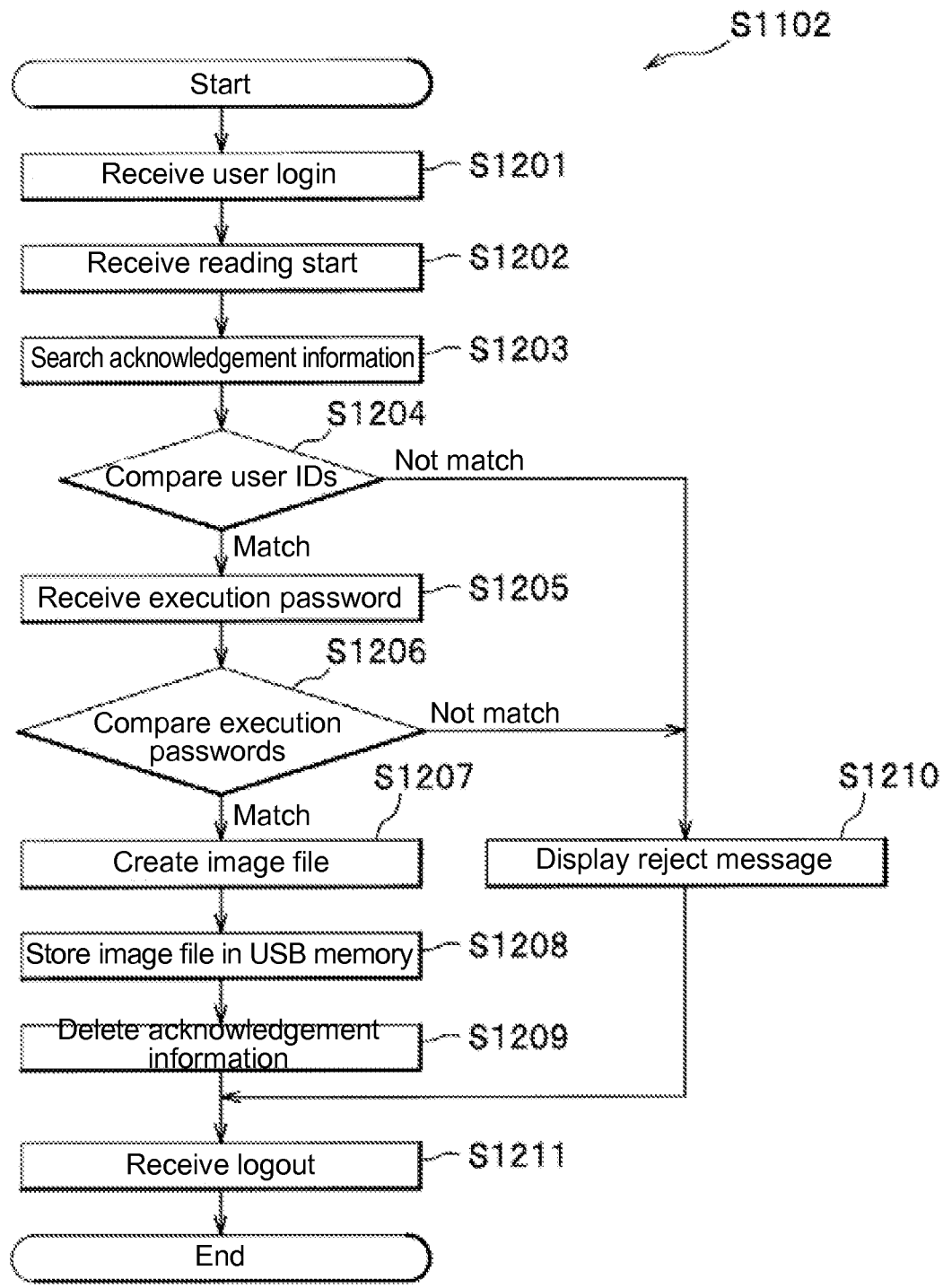
FIG. 12 is a flow chart showing an image file writing process of the image processing apparatus according to the first embodiment of the present invention.

FIG. 12 is a flow chart showing the image file writing process (step S1102) of the image processing apparatus 100 according to the first embodiment of the present invention.

In step S1201, when the control unit 108 of the MFP 100 receives the user ID and the login password from the operation panel 700 (refer to FIG. 6), the control unit 108 receives a user login. When the user sets the original in the feeder and pushes the start key 705 of the operation panel 700, the control unit 108 receives a reading start.

In step S1203, the determining unit 110 searches the acknowledgement information 400 (refer to FIG. 4) with the user ID as a key. In step S1204, the determining unit 110 compares the user ID thus logged in with the user ID registered in the acknowledgement information 400. When the determining unit 110 determines that the user ID thus logged in matches to the user ID registered in the acknowledgement information 400 in step S1204, the determining unit 110 displays the message 800 (refer to FIG. 7) on the display screen 702 for prompting the user to input the execution password, and the process proceeds to step S1205.

In step S1210, when the determining unit 110 determines that the user ID thus logged in does not match to the user ID registered in the acknowledgement information 400 in step S1204, the determining unit 110 displays the message 900 (refer to FIG. 8) on the display screen 702 for indicating that the image file is not allowed to store in the USB memory 130, and the process proceeds to step S1211.

In step S1205, the control unit 108 receives the execution password input by the user through the operation panel 700. In step S1206, the determining unit 110 compares the execution password thus input with the execution password 403 registered in the acknowledgement information 400. In step S1207, when the determining unit 110 determines that the execution password thus input matches to the execution password 403, the reading unit 101 reads the original, so that the image processing unit 102 creates the image file 500 from the original thus read, and the process proceeds to step S1208.

When the determining unit 110 determines that the execution password thus input does not match to the execution password 403, the process proceeds to step S1210, thereby displaying the message 900 (refer to FIG. 8) on the display screen 702 for indicating that the image file is not allowed to store in the USB memory 130.

In step S1208, the writing unit 107 stores the image file 500 thus created in the USB memory 130. In step S1209, the corresponding record is deleted from the acknowledgement information 400. In step S1211, the control unit 108 receives logout of the user.

In the embodiment, the corresponding record is deleted from the acknowledgement information 400 in step S1209. Alternatively, non-executable information is overwritten on the corresponding record to be deleted. Accordingly, the corresponding record remains in the USB memory 130, so that the administrator of the MFP 100 can confirm history information of the acknowledgement information 400.

As described above, in the embodiment, the acknowledgement information 400 acknowledged by the acknowledger is used only once. Accordingly, it is possible to restrict the writing in the USB memory 130 only once. As a result, even when the execution password specified by the acknowledger is leaked, it is possible to prevent unrestricted writing.

Second Embodiment

A second embodiment of the present invention will be explained. In the second embodiment, after an execution password is authenticated, an image file is encrypted and written in the USB memory 130, thereby improving security. An image processing apparatus 100A will be explained with reference to FIGS. 13 to 21. Note that components shown in FIG. 13 similar to those shown in FIG. 1 are designated with the same reference numerals, and explanations thereof are omitted.

Figure 13:
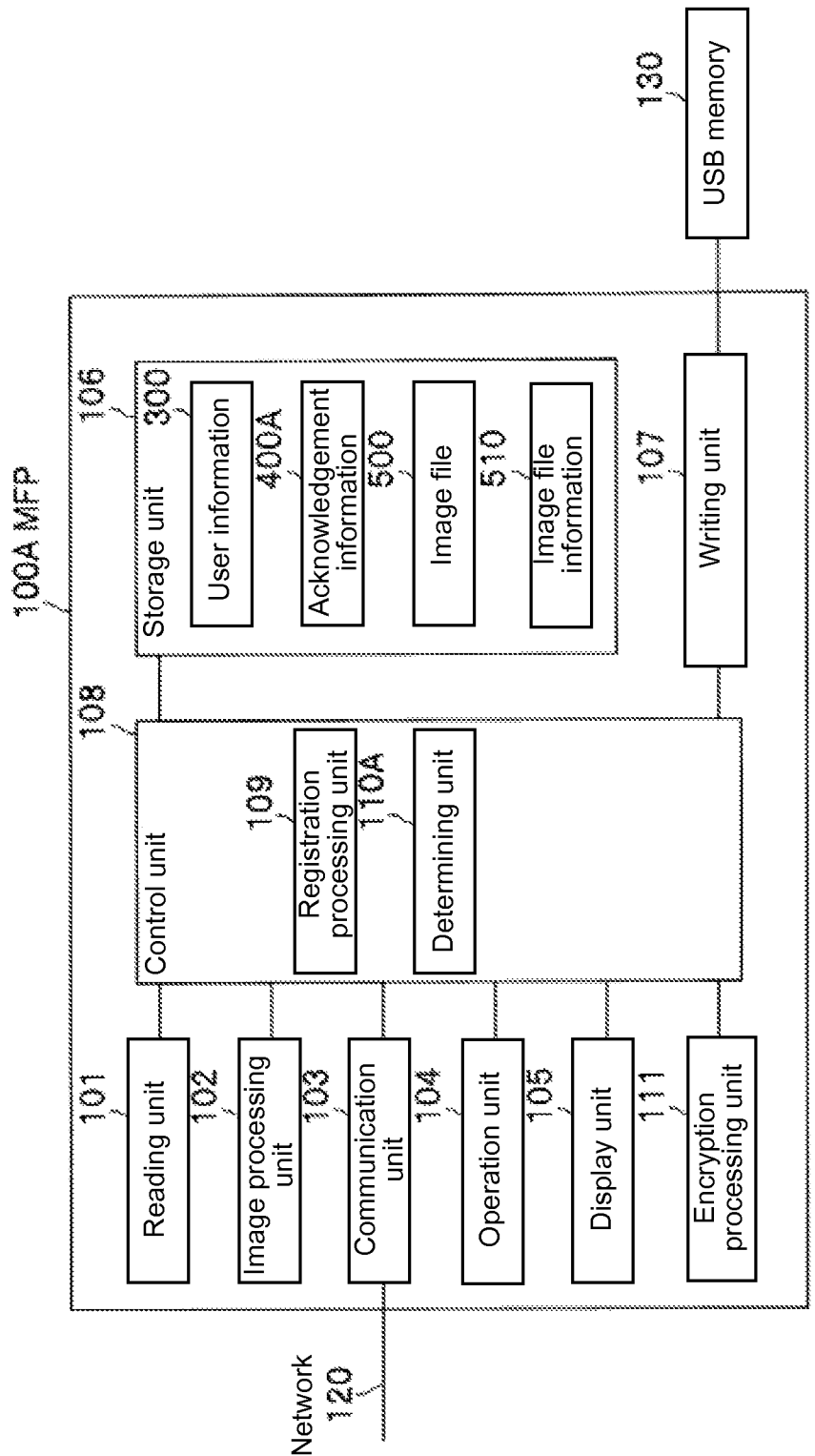
FIG. 13 is a block diagram showing an image processing apparatus according to a second embodiment of the present invention.

FIG. 13 is a block diagram showing the image processing apparatus or an MFP 100A according to the second embodiment of the present invention.

As shown in FIG. 13, the MFP 100A includes the reading unit 101; the image processing unit 102; the communication unit 103; the operation unit 104; the display unit 105; the storage unit 106; the writing unit 107; the control unit 108; and an encryption processing unit 111. The control unit 108 controls each component.

In the embodiment, the encryption processing unit 111 has a function of encrypting the image file 500 using an execution password specified in an acknowledgement mail 620 (refer to FIG. 16). Note that it is possible to decrypt the image file 500 thus encrypted using the execution password.

In the embodiment, the control unit 108 includes the registration processing unit 109 for processing the acknowledgement mail 620 (refer to FIG. 16) received through the communication unit 103, and for registering the acknowledgement mail 620 as acknowledgement information 400A (refer to FIG. 17) into the storage unit 106. Further, the control unit 108 includes a determining unit 110A for determining whether to allow writing into the USB memory 130 according to information input from the operation unit 104.

In the embodiment, the determining unit 110A has a function of determining whether input information is registered in the acknowledgement information 400A. When the determining unit 110A determines that the input information is registered in the acknowledgement information 400A, the control unit 108 stores the image file encrypted with the determining unit 110A in the USB memory 130 through the writing unit 107. The storage unit 106 is used when the user logs in the MFP 100A, and stores the user information (refer to FIG. 3) registered by the administrator in advance, the acknowledgement information 400A, the image file 500, and image file information 510 (refer to FIG. 14).

FIG. 14 is a schematic view showing an example of the image file information 510 according to the second embodiment of the present invention.

As shown in FIG. 14, the image file information 510 includes a user ID 511; a file name 512 of the image file created with the image processing unit 102; and a hash value 513 for identifying the image file. The hash value 513 is obtained through an operation of obtaining a numerical value representing data when the data are received, or through a function (a hash function) for obtaining such a value. For example, in FIG. 14, when the file name 512 is "ABC.pdf", the hash value 513 is "0x3F42".

FIG. 15 is a schematic view showing an example of the acknowledgement request mail 610 according to the second embodiment of the present invention. The acknowledgement request mail 610 is sent from the MFP 100A to the acknowledger associated with the user ID 301 registered in the user information 300.

As shown in FIG. 15, the acknowledgement request mail 610 includes a main text containing information of a user ID of the user logging in the MFP 100A; a user name thereof; the file name; and the check value (a hash value). Further, the acknowledgement mail 600 includes the image file 500 before the encryption as an attachment file. After the acknowledger confirms the image file, when the acknowledger determines that the image file can be stored in the USB memory 130, the acknowledger sends an acknowledgement mail 620 (refer to FIG. 16) to the MFP 100A.

FIG. 16 is a schematic view showing an example of the acknowledgement mail 620 according to the second embodiment of the present invention. As described above, when the acknowledger determines that the image file 500 can be stored in the USB memory 130, the acknowledger sends the acknowledgement mail 620 (refer to FIG. 16) to the MFP 100A. The acknowledgement mail 620 includes a main text containing the user ID, the execution password, and the check value (the hash value). The acknowledgement mail 620 includes a mail address of the sender in a mail header thereof.

In the embodiment, the registration processing unit 109 (refer to FIG. 1) compares the mail address of the sender with the acknowledger mail address (refer to FIG. 3) registered in the user information 300 by the administrator. When the registration processing unit 109 determines that the mail address of the sender matches to the acknowledger mail address, the registration processing unit 109 registers the mail address to the acknowledgement information 400A. When the registration processing unit 109 determines that the mail address of the sender does not match to the acknowledger mail address, the registration processing unit 109 determines that the mail is not sent from the acknowledger and does not register the mail address to the acknowledgement information 400A. Accordingly, it is possible to exclude a mail from an unauthorized user.

Figures 17, 18:
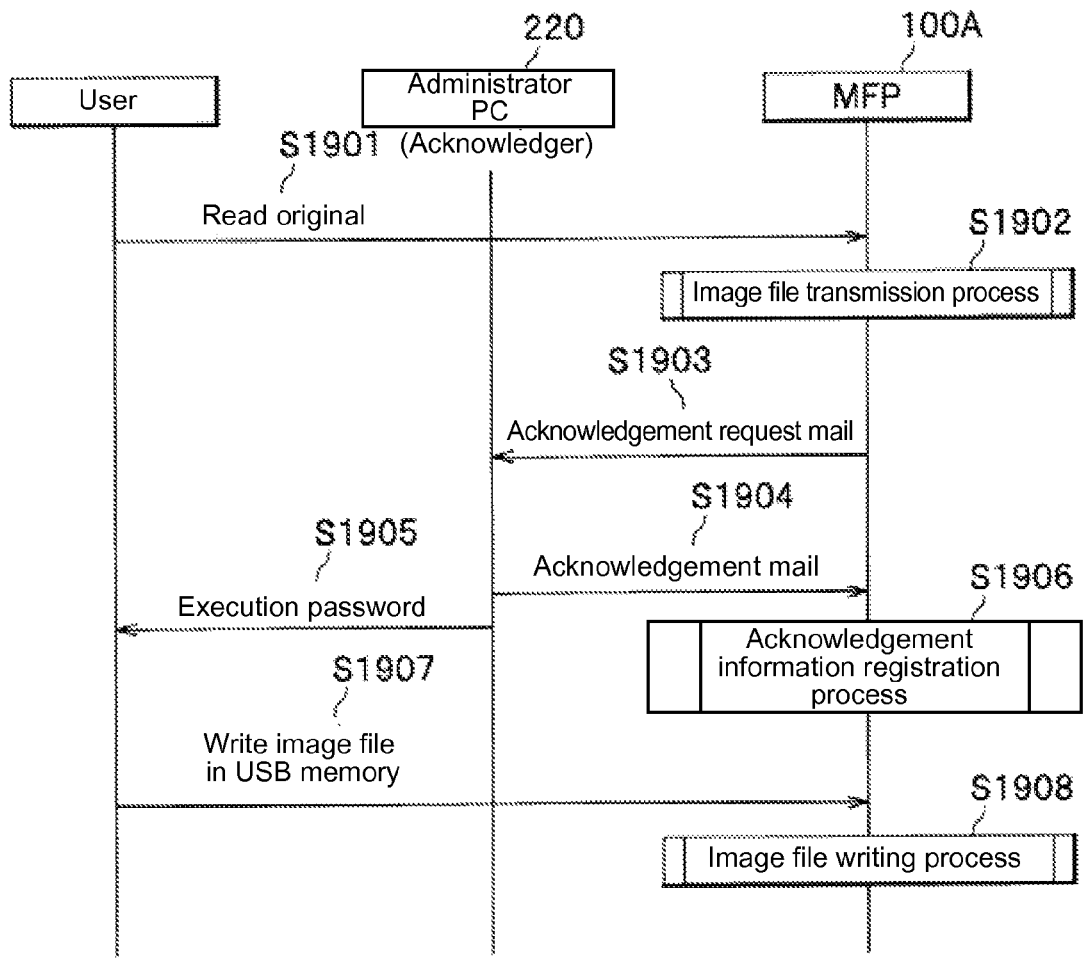
FIG. 17 is a schematic view showing an example of acknowledgement information according to the second embodiment of the present invention.
FIG. 18 is a schematic view showing a sequence of an operation of the image processing apparatus according to the second embodiment of the present invention.

FIG. 17 is a schematic view showing an example of the acknowledgement information 400A according to the second embodiment of the present invention.

As shown in FIG. 17, the acknowledgement information 400A includes the registration number 401; the user ID 402; the execution password 403 to be input upon writing the image file in the USB memory 130; and a hash value 410 for identifying the image file. The registration number 401 is added when new acknowledgement information is registered.

In the embodiment, the execution password 403 is used when the image file is written in the USB memory 130. Further, the execution password 403 is used when the image file is encrypted, or the image file thus encrypted is decrypted.

An operation of the MFP 100A will be explained next. FIG. 18 is a schematic view showing a sequence of the operation of the image processing apparatus 100A according to the second embodiment of the present invention.

In step S1901, the user instructs the MFP 100A to read the original. In step S1902, the MFP 100A reads the original, and performs an image file transmission process (refer to FIG. 19). In step S1903, when the image file transmission process (refer to FIG. 19) is performed, the MFP 100A sends the acknowledgement request mail 610 (refer to FIG. 15) to the acknowledger.

The acknowledger confirms contents of the acknowledgement request mail 610 including the user ID, the user name, and the image file attached thereto with the administrator PC 220. In step S1904, when the acknowledger allows the image file to store in the USB memory 130, the acknowledger sends the acknowledgement mail 620 (refer to FIG. 16) to the MFP 100A. In step S1905, the user obtains the execution password. In this case, the user may obtain the execution password from the acknowledger in person, thereby making it possible to respond quickly.

Figure 20:
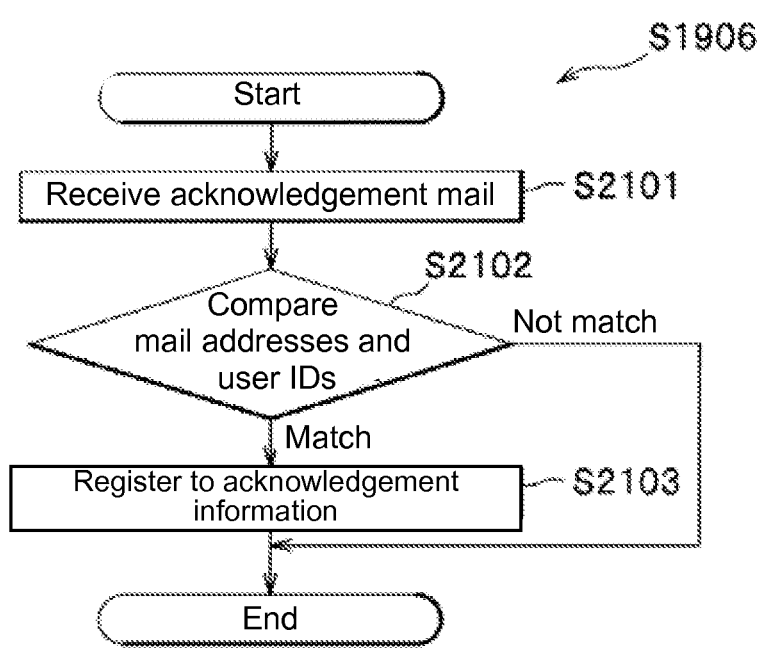
FIG. 20 is a flow chart showing an acknowledgement information registration process of the image processing apparatus according to the second embodiment of the present invention.

In step S1906, when the MFP 100A receives the acknowledgement mail 620, the MFP 100A performs an acknowledgement information registration process (refer to FIG. 20). In step S1907, the user operates the MFP 100A to execute an image file writing instruction relative to the USB memory 130. In step S1908, according to the operation instruction of the user, the MFP 100A performs an image file writing process (refer to FIG. 21).

In the embodiment, the user may obtain the execution password from the acknowledger in person in step S1905. Alternatively, the acknowledger may send a main containing the execution password to a mobile phone of the user. In this case, the user does not need to leave from the MFP 100A, and can confirm the execution password from the mail received on the mobile phone.

Figure 19:
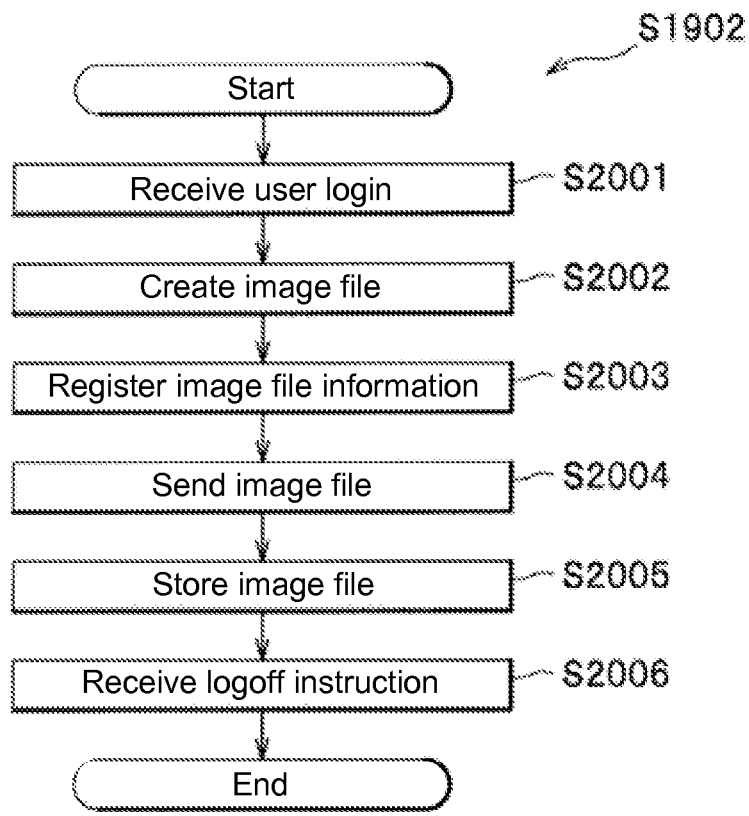
FIG. 19 is a flow chart showing an image file transmission process of the image processing apparatus according to the first embodiment of the present invention.

FIG. 19 is a flow chart showing the image file transmission process of the image processing apparatus 100A according to the first embodiment of the present invention.

In step S2001, when the control unit 108 of the MFP 100A receives the user ID and the login password from the operation panel 700 (refer to FIG. 6), the control unit 108 receives the user login. When the user sets the original in the feeder and pushes the start key 705 of the operation panel 700, the reading start is instructed.

In step S2202, when the control unit 108 receives the reading start, the reading unit 101 reads the original and the image processing unit 102 creates the image file 500. In step S2003, the control unit 108 applies the hash function to the image file 500 to calculate the hash value, and creates and registers the image file information 510 associated with the user ID and the file name.

In the next step, the control unit 108 searches the user information 300 (refer to FIG. 3) with the user ID as a key to obtain the acknowledger mail address. In step S2004, the control unit 108 sends the acknowledgement request mail 610 (refer to FIG. 15) with the image file as an attachment to the mail address of the acknowledger through the communication unit 103. In step S2005, the control unit 108 stores the image file 500 thus created in the storage unit 106. In step S2006, the control unit 108 receives a logoff instruction from the user.

FIG. 20 is a flow chart showing the acknowledgement information registration process of the image processing apparatus 100A according to the second embodiment of the present invention.

In step S2101, when the communication unit 103 of the MFP 100A receives the acknowledgement mail 620 (refer to FIG. 16) from the acknowledger, the registration processing unit 109 obtains the mail address of the user from the mail header of the acknowledgement mail 620 and the user ID from the mail text of the acknowledgement mail 620. In step S2102, the registration processing unit 109 compares the mail address and the user ID thus obtained with the acknowledger mail address and the user ID 301 registered in the user information 300 (refer to FIG. 3).

In step S2103, when the registration processing unit 109 determines that the mail address of the sender of the acknowledgement mail 620 matches to the acknowledger mail address registered associated with the user ID, the registration processing unit 109 registers the contents of the main text of the acknowledgement mail 620 (the user ID, the execution password, the check value or the hash value) as the acknowledgement information 400A (refer to FIG. 17). When the registration processing unit 109 determines that the mail address does not match to the acknowledger mail address, the registration processing unit 109 determines that the mail is not sent from the acknowledger, and does not register in the acknowledgement information 400A, thereby completing the process.

Figure 21:
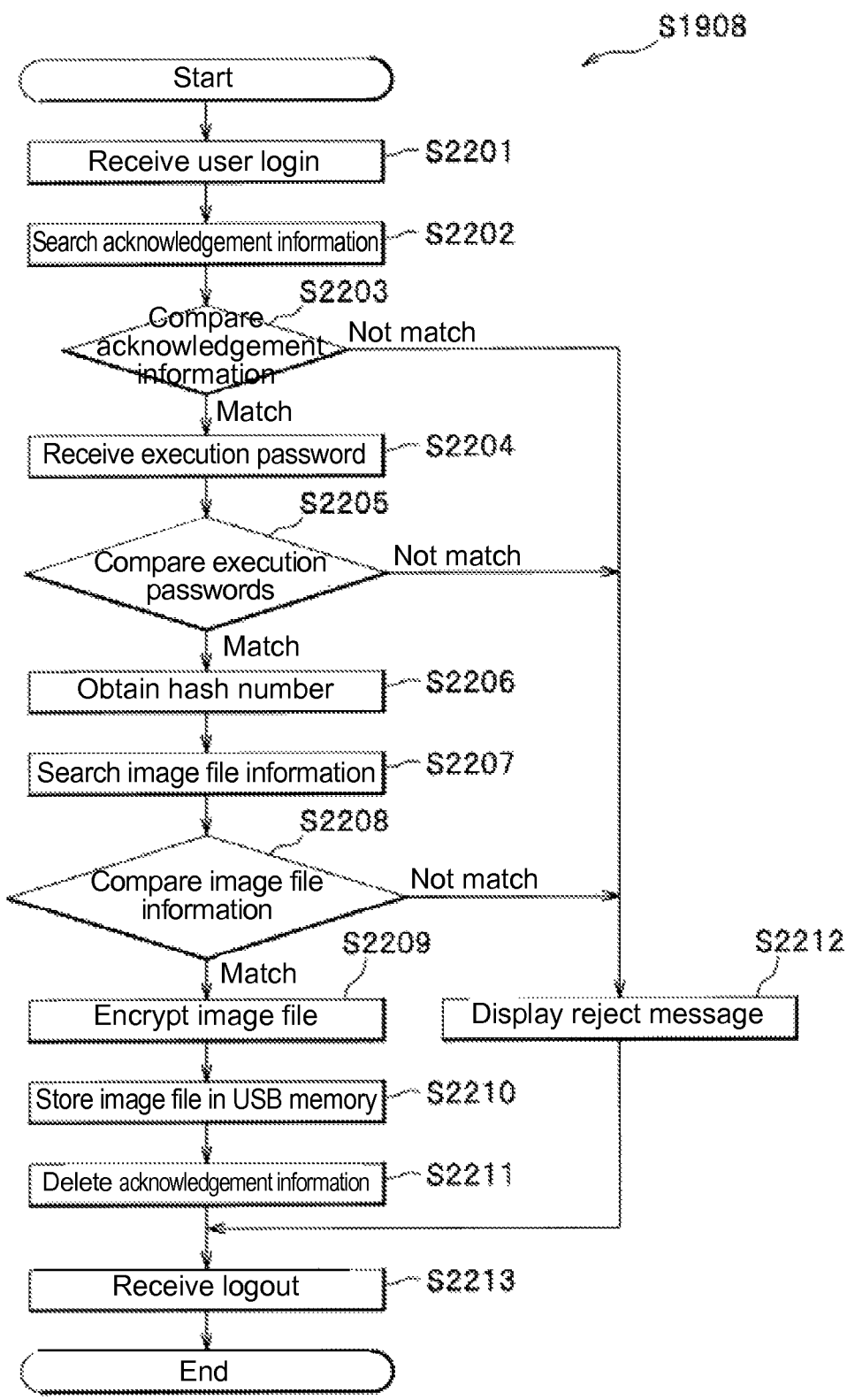
FIG. 21 is a flow chart showing an image file writing process of the image processing apparatus according to the first embodiment of the present invention.

FIG. 21 is a flow chart showing the image file writing process of the image processing apparatus 100A according to the first embodiment of the present invention.

In step S2201, when the control unit 108 of the MFP 100A receives the user ID and the login password from the operation panel 700 (refer to FIG. 6), the control unit 108 receives the user login. In step S2202, the determining unit 110A searches the acknowledgement information 400A (refer to FIG. 17) with the user ID as a key. In step S2203, the determining unit 110A compares the user ID thus logged in with the user ID registered in the acknowledgement information 400A.

When the determining unit 110A determines that the user ID thus logged in matches to the user ID registered in the acknowledgement information 400s in step S2203, the determining unit 110A displays the message 800 (refer to FIG. 7) on the display screen 702 for prompting the user to input the execution password, and the process proceeds to step S2204. In step S2212, when the determining unit 110A determines that the user ID thus logged in does not match to the user ID registered in the acknowledgement information 400A in step S2203, the determining unit 110A displays the message 900 (refer to FIG. 8) on the display screen 702 for indicating that the image file is not allowed to store in the USB memory 130, and the process proceeds to step S2213.

In step S2204, the control unit 108 receives the execution password input by the user through the operation panel 700. In step S2205, the determining unit 110A compares the execution password thus input with the execution password 403 registered in the acknowledgement information 400. In step S2206, when the determining unit 110A determines that the execution password thus input matches to the execution password 403, the determining unit 110A obtains the hash value 410 from the acknowledgement information 400A.

In step S2207, the determining unit 110A searches the image file information 510 with the user ID and the hash value currently logged in as a key. In step S2208, the determining unit 110A compares the user ID and the hash value currently logged with the user ID and the hash value of the image file information 510. In step S2209, when the determining unit 110A determines that the user ID and the hash value currently logged match to the user ID and the hash value of the image file information 510, the encryption processing unit 111 uses the execution password to encrypt the image file 500 of the corresponding file name, and the process proceeds to step S2210.

When the determining unit 110A determines that the user ID and the hash value currently logged do not match to the user ID and the hash value of the image file information 510 in step S2208, the process proceeds to step S2212, thereby displaying the message 900 (refer to FIG. 8) on the display screen 702 for indicating that the image file is not allowed to store in the USB memory 130.

In step S2210, the writing unit 107 stores the image file thus encrypted in the USB memory 130. In step S2211, corresponding record is deleted from the acknowledgement information 400. In step S2213, the control unit 108 receives logout of the user.

In the embodiment, the corresponding record is deleted from the acknowledgement information 400 in step S2211. Alternatively, non-executable information is overwritten on the corresponding record to be deleted. Accordingly, the corresponding record remains in the USB memory 130, so that the administrator of the MFP 100A can confirm history information of the acknowledgement information 400A.

As described above, in the embodiment, the acknowledger can confirm the image file to be stored in the USB memory 130 before allowing the user to store the image file. Further, the acknowledgement information 400A acknowledged by the acknowledger is used only once. Accordingly, it is possible to restrict the writing in the USB memory 130 only once. As a result, even when the execution password specified by the acknowledger is leaked, it is possible to prevent unrestricted writing.

Further, the image file encrypted with the execution password specified by the acknowledger is stored in the USB memory 130. Accordingly, even if the USB memory 130 is lost or stolen, it is not possible to open the image file stored in the USB memory 130, thereby preventing information from leaking.

Third Embodiment

A third embodiment of the present invention will be explained next.

In the third embodiment, an information management system includes the administrator PC 220 and the MFP 100 connected to the administrator PC 220 through the network 120. The administrator PC 220 sends the acknowledgement mail for allowing the image file 500 to be stored in a detachable recording medium (for example, the USB memory 130). The MFP 100 is the image processing apparatus for writing the image file in the detachable recording medium.

In the embodiment, the storage unit 106 of the MFP 100 stores the user information 300 in advance for correlating the user ID of the user using the image processing apparatus with the mail address of the acknowledger. When the MFP 100 obtains the image file 500, the MFP 100 stores the image file 500 in the storage unit 106. When the MFP 100 receives the acknowledgement mail from the administrator PC 220, the MFP 100 registers the user ID and the authentication information (the execution password) contained in the acknowledgement mail as the acknowledgement information 400 in the storage unit 106 when the user ID and the mail address of the acknowledger contained in the acknowledgement mail are registered in the user information 300.

Further, the MFP 100 determines whether the user ID and the authentication information received from the operation unit 104 (the input unit) are registered in the acknowledgement information. When the authentication information is authenticated, the MFP 100 allows the image file 500 stored in the storage unit 106 to be written in the detachable recording medium. When the image file 500 is completely written in the detachable recording medium, the acknowledgement information is deleted.

Fourth Embodiment

A fourth embodiment of the present invention will be explained next.

In the fourth embodiment, an information management system includes the administrator PC 220 and the MFP 100A connected to the administrator PC 220 through the network 120. The administrator PC 220 sends the acknowledgement mail for allowing the image file 500 to be stored in a detachable recording medium (for example, the USB memory 130). The MFP 100A is the image processing apparatus for writing the image file in the detachable recording medium.

In the embodiment, the storage unit 106 of the MFP 100A stores the user information 300 in advance for correlating the user ID of the user using the image processing apparatus with the mail address of the acknowledger. When the MFP 100A obtains the image file 500, the MFP 100A stores the image file 500 in the storage unit 106, and sends the acknowledgement request mail with the image file 500 attached thereto to the administrator PC 220. When the MFP 100A receives the acknowledgement mail from the administrator PC 220, the MFP 100A registers the user ID and the authentication information (the execution password) contained in the acknowledgement mail as the acknowledgement information 400 in the storage unit 106 when the user ID and the mail address of the acknowledger contained in the acknowledgement mail are registered in the user information 300.

Further, the MFP 100 determines whether the user ID and the authentication information received from the operation unit 104 (the input unit) are registered in the acknowledgement information. When the authentication information is authenticated, the MFP 100A allows the image file 500 stored in the storage unit 106 to be written in the detachable recording medium. When the image file 500 is completely written in the detachable recording medium, the acknowledgement information is deleted.

In the embodiments described above, the reading unit 101 of the MFP 100 or the MFP 100A is explained as the image file acquiring unit, and is not limited thereto. The image file acquiring unit is applicable to a scanner or a facsimile having a scanning function and other devices.

More specifically, the image file acquiring unit may include a photograph unit for photographing an original, so that an image photographed with the photograph unit can be acquired. Further, the image file acquiring unit may include a facsimile receiving unit, so that an image received with the facsimile receiving unit can be acquired.

The disclosure of Japanese Patent Application No. 2008-229033, filed on Sep. 5, 2008, is incorporated in the application by the reference.

While the invention has been explained with reference to the specific embodiments of the invention, the explanation is illustrative and the invention is limited only by the appended claims.

What is claimed is:

1. An image processing apparatus comprising:
    a storage unit for storing user information correlating first user identification information and acknowledger information in advance;
    a control unit for controlling a specific process;
    a communication unit for receiving an acknowledgement notice containing second user identification information from an acknowledger;
    a registration processing unit for determining whether the second user identification information matches the first user identification information, and for registering acknowledgement information in the storage unit indicating that a user identified by the first user identification information and the second user identification information is acknowledged when an email address of the acknowledger in the acknowledgement notice matches the acknowledger information;
    an input unit for receiving third user identification information; and
    a determining unit for allowing the control unit to perform the specific process when the third user identification information received through the input unit corresponds to the acknowledgement information,
    wherein said first user identification information, said second user identification information, and said third user identification information are respectively designed to identify the user who uses the image processing apparatus, and
    said acknowledger information is designed to identify the acknowledger different from the user and who acknowledges the user to use the image processing apparatus.

2. The image processing apparatus according to claim 1, further comprising an encryption unit for encrypting the image file according to the authentication information.

3. The image processing apparatus according to claim 1, wherein said registration processing unit is configured to correlate and register the second user identification information and first authentication information contained in the acknowledgement notice as the acknowledgement information in the storage unit when the second user identification information matches the first user identification information, and
    said determining unit is configured to allow the specific process to be performed when the third user identification information and second authentication information received through the input unit correspond to the first user identification information and the first authentication information.

4. The image processing apparatus according to claim 3, wherein said storage unit is arranged to store the first user identification information including a user ID.

5. The image processing apparatus according to claim 3, wherein said registration processing unit is arranged to correlate a specific set time to the second user identification information, and to register the specific set time and the second user identification information as the acknowledgement information in the storage unit when the specific set time is contained in the acknowledgement notice.

6. The image processing apparatus according to claim 5, wherein said determining unit is arranged to determine whether the specific set time is registered in the acknowledgement information, and for allowing the image file stored in the storage unit to be written in the detachable storage medium in the specific process when authentication information is authenticated.

7. The image processing apparatus according to claim 3, further comprising an image file acquiring unit for acquiring an image file to be stored in the storage unit, said control unit being configured to control the specific process including a writing process for writing the image file in a detachable storage medium.

8. The image processing apparatus according to claim 7, wherein said determining unit is arranged to delete the acknowledgement information after the image file is written in a detachable storage medium.

9. The image processing apparatus according to claim 7, wherein said determining unit is arranged to overwrite unusable information on the acknowledgement information after the image file is written in the detachable storage medium.

10. The image processing apparatus according to claim 7, wherein said image file acquiring unit includes a scanner unit for reading an original so that the image file acquiring unit acquires an image read with the scanner unit.

11. The image processing apparatus according to claim 7, wherein said image file acquiring unit includes a photograph unit for photographing an original so that the image file acquiring unit acquires an image photographed with the photograph unit.

12. The image processing apparatus according to claim 7, wherein said image file acquiring unit is arranged to acquire an image from a mail received through the communication unit.

13. The image processing apparatus according to claim 7, wherein said image file acquiring unit includes a facsimile unit so that the image file acquiring unit acquires an image received with the facsimile unit.

14. The image processing apparatus according to claim 7, wherein said control unit is configured to receive the third user identification information and the second authentication information from the input unit before the image file is written in the detachable storage medium.

15. The image processing apparatus according to claim 3, wherein said control unit is configured to register the second user identification information contained in the acknowledgement notice as the acknowledgement information including page number information so that a page number of the image file to be written in the detachable storage medium can be restricted.

16. The image processing apparatus according to claim 3, wherein said storage unit is configured to store the user information correlating the first user identification information, login authentication information, and the acknowledger information, and
    said registration processing unit is configured to receive the second user identification information and the second authentication information when the second user identification information and the login authentication information received through the input unit correspond respectively to the first user identification information and the login authentication information.

17. The image processing apparatus according to claim 1, wherein said registration processing unit is configured to set a default value as a deletion time when the acknowledgement notice does not include the deletion time.

18. The image processing apparatus according to claim 1, wherein said input unit is configured to receive the third user identification information after the registration processing unit registers the acknowledgement information.

19. An information management system comprising:
a network;
an acknowledgement terminal for sending an acknowledgement notice allowing an image file to be written in a detachable storage medium; and
an image processing apparatus connected to the acknowledgement terminal through the network for writing the image file in the detachable storage medium,
wherein said image processing apparatus includes a storage unit for storing user information correlating first user identification information and acknowledger information in advance so that the image processing apparatus stores an image file in the storage unit when the image processing apparatus acquires the image file,
said image processing apparatus is configured to receive an acknowledgement notice containing second user identification information from an acknowledger,
said image processing apparatus is configured to determine whether the second user identification information matches the first user identification information,
said image processing apparatus is configured to register acknowledgement information in the storage unit indicating that a user identified by the first user identification information and the second user identification information is acknowledged when an email address of the acknowledger in the acknowledgement notice matches the acknowledger information,
said image processing apparatus is configured to allow the control unit to perform the specific process when third user identification information received through an input unit corresponds to the acknowledgement information,
said image processing apparatus is configured to delete the acknowledgement information after the image file is written in the detachable storage medium,
said first user identification information, said second user identification information, and said third user identification information are respectively designed to identify the user who uses the image processing apparatus, and
said acknowledger information is designed to identify the acknowledger different from the user and who acknowledges the user to use the image processing apparatus.

* * * * *